United States Patent [19]
Kuriyama

[11] Patent Number: 5,910,652
[45] Date of Patent: Jun. 8, 1999

[54] PORTABLE TERMINAL APPARATUS FOR AN IC CARD FOR SUPPLYING A POWER SOURCE VOLTAGE IN A PREDETERMINED TIMING

[75] Inventor: Ryouichi Kuriyama, Zushi, Japan

[73] Assignee: Kabushiki Kaisha Toshiba, Kawasaki, Japan

[21] Appl. No.: 08/791,783

[22] Filed: Jan. 29, 1997

[30] Foreign Application Priority Data

Jan. 31, 1996 [JP] Japan .................................. 8-016034

[51] Int. Cl.$^6$ .................................................. G06K 19/06
[52] U.S. Cl. ........................... 235/492; 235/380; 902/26
[58] Field of Search .................................. 235/382, 436, 235/441, 444, 482, 485, 486, 492

[56] References Cited

U.S. PATENT DOCUMENTS

| | | | |
|---|---|---|---|
| 4,755,660 | 7/1988 | Nakano | 235/380 |
| 5,015,830 | 5/1991 | Masuzawa et al. | 235/441 |
| 5,146,068 | 9/1992 | Ugawa et al. | 235/441 |
| 5,247,164 | 9/1993 | Takahashi | 235/492 |
| 5,450,365 | 9/1995 | Adachi | 365/226 |
| 5,541,985 | 7/1996 | Ishii et al. | 379/111 |

FOREIGN PATENT DOCUMENTS

| | | | |
|---|---|---|---|
| 0 237 883 | 9/1987 | European Pat. Off. | |
| WO 95/04328 | 2/1995 | WIPO | 235/492 |

*Primary Examiner*—Donald Hajec
*Assistant Examiner*—Jared J. Fureman
*Attorney, Agent, or Firm*—Pillsbury Madison & Sutro LLP

[57] ABSTRACT

An apparatus for performing processing on an integrated circuit medium includes a mechanism for performing transfer to and from the integrated circuit medium held therein, and a controller adapted to supply a power supply voltage to the integrated circuit medium after a predetermined condition has been satisfied with the integrated circuit medium set in the apparatus and to stop the supply of the power supply voltage when predetermined processing is completed on the integrated circuit medium.

5 Claims, 5 Drawing Sheets

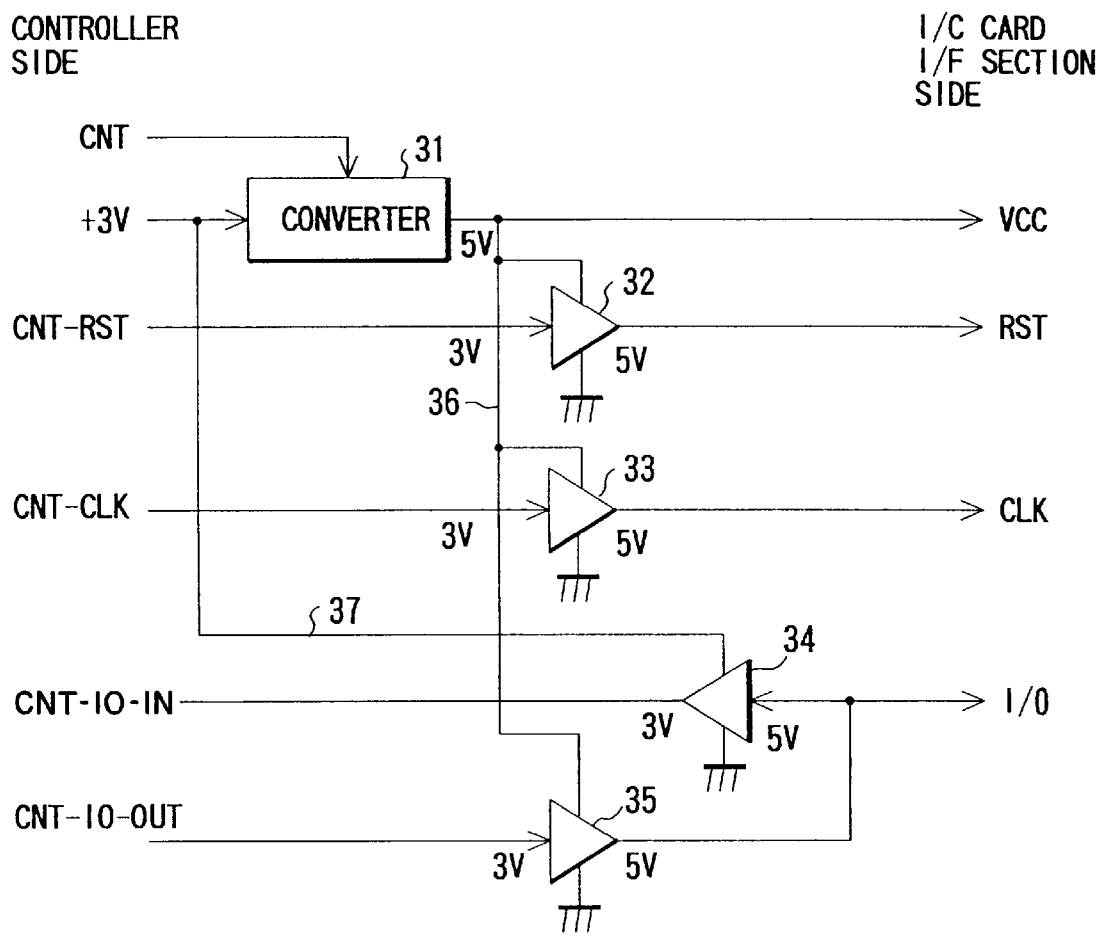
F I G. 4

PORTABLE TERMINAL APPARATUS FOR AN IC CARD FOR SUPPLYING A POWER SOURCE VOLTAGE IN A PREDETERMINED TIMING

BACKGROUND OF THE INVENTION

The present invention relates to a portable terminal apparatus for an IC card which can selectively read out various transaction data and amount data from the IC card for use as a credit card and electronic money, and display them.

Recently, those IC cards serving as a hand-held storage medium and including an IC chip having a nonvolatile memory and control element, such as a CPU (central processing unit) for controlling associated component parts have been utilized in various sectors of industry.

This type of IC card, such as a credit card and electronic money, proves very useful if various kinds of transaction data, amount data, etc., stored therein can be read out if necessary and displayed.

Recently, in order to achieve such an object of the present invention, a portable terminal apparatus for an IC card has been developed which can be carried at all times with the user. The portable terminal apparatus is formed to have a card-like configuration. The apparatus includes a keyboard, liquid crystal display unit and battery for its own use and for a power supply to the IC card. With the IC card inserted, it selectively reads out the various transaction data and amount data, in accordance with a key operation on its keyboard and displays them.

In such portable terminal apparatus, an internal circuit has conventionally been operated with a signal voltage supplied to the IC card. Further, in the case where key matching is to be done, password data for key matching is input to the apparatus after the IC card has been duly activated.

In the case where the data is read out of the IC card, first the IC card is activated and corresponding data is read out and displayed. Until the display is finished, the IC card is kept ON and then deactivated when the display is finished. Since, therefore, the IC card is supplied with an electric current during its activation, the efficiency of a dissipation current is poor.

In the case where an error is generated when reading data out of the IC card, a corresponding error message is displayed and then deactivated. For this reason, until the display is finished the IC card stays activated and, during the activation, electric current flows through the IC card. As a result, the efficiency of the dissipation current is poor.

In order for the conventional portable terminal apparatus to be made compact in size and low in cost, it is necessary to reduce the size and capacity of a battery serving as a power supply. However, there is a limit that the operation voltage of an associated internal circuit is made equal to that of the IC card.

Further, with the IC card activated, a power supply voltage is kept supplied to the IC card. In the case where the password data is input from an outside source, if there is either a wait or password data to be input or no data is input to the apparatus, dissipation current continues to flow over a predetermined time period. For this reason, the dissipation current becomes very large and the life of the battery, that is, a power supply, is shortened. That is, the longer the access time of the IC card, the shorter the battery life.

BRIEF SUMMARY OF THE INVENTION

It is accordingly the object of the present invention to provide a portable terminal apparatus for an IC card which can make a dissipation current small as a whole and prolong the life of a battery serving as a power supply.

A data processing apparatus for an integrated circuit medium of the present invention comprises means for holding an integrated circuit medium in place and for performing transfer of a signal to and from the medium; means for supplying a first power supply voltage to the integrated circuit medium, when a signal indicating input of a password is received from the integrated circuit medium and the integrated circuit medium is held in place; means for performing predetermined processing on the integrated circuit medium such as performing password matching; and means for stopping the first supply voltage after the processing means has finished the predetermined processing.

In the arrangement of the present invention, a power supply voltage is not supplied to the IC card, unlike the conventional art, throughout a period in which the portable terminal apparatus is set in the IC card. A power supply voltage is supplied to the IC card only during a period in which the power supply voltage is required for data processing to be performed by the portable terminal apparatus on the IC card. In other words, the conventional apparatus is adapted to automatically supply the power supply voltage to the IC card in response to the detection of the setting of the IC card in the apparatus and, therefore, the power supply voltage is supplied over a prolonged time period in which the power supply voltage is no longer necessary. According to the present invention, the power supply voltage is supplied only during a time period in which it is truly required at a time of, for example, reading or writing data. According to the present invention, it is possible to lower a dissipation power involved.

According to another aspect of the present invention, there is provided a method for processing data on an integrated circuit medium, comprising the steps of: confirming an integrated circuit medium as being set in a data processing apparatus; deciding whether or not password data input to the data processing apparatus is right after confirming the integrated circuit medium as being set in the data processing apparatus; confirming that key data is input by an inputting section in the terminal apparatus, after it is confirmed that the IC card is inserted in the terminal apparatus; supplying a predetermined power supply voltage to the integrated circuit medium when the deciding step decides; that a password has been entered; performing data processing on the integrated circuit medium; and stopping the supply of the predetermined power supply voltage to the integrated circuit medium when the data processing is completed and displaying the data read from the IC card, after the supplying of the power source voltage to the IC card is stopped.

In the data processing method of the present invention, the power supply voltage is supplied to the IC card, only after the password or key data is input to the portable terminal apparatus, instead of supplying the power supply voltage to the IC card immediately upon insertion of the IC card into the apparatus as in the prior art. Since the dissipation current is not generated in the IC card during the password deciding processing of the portable terminal apparatus at which it is not necessary to supply the power supply voltage to the IC card, it is possible to provide a data processing method capable of reducing the dissipation current involved. Further, it is possible, according to the present invention, to supply a power supply voltage only during a time period required for data processing to be performed and stop it during the rest of the time period. It is, thus, possible to reduce the dissipation current even in this case.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a block diagram showing an arrangement of a voltage conversion circuit;

DETAILED DESCRIPTION OF THE INVENTION

An embodiment of the present invention will be explained below with reference to the accompanying drawings.

Figure 1:
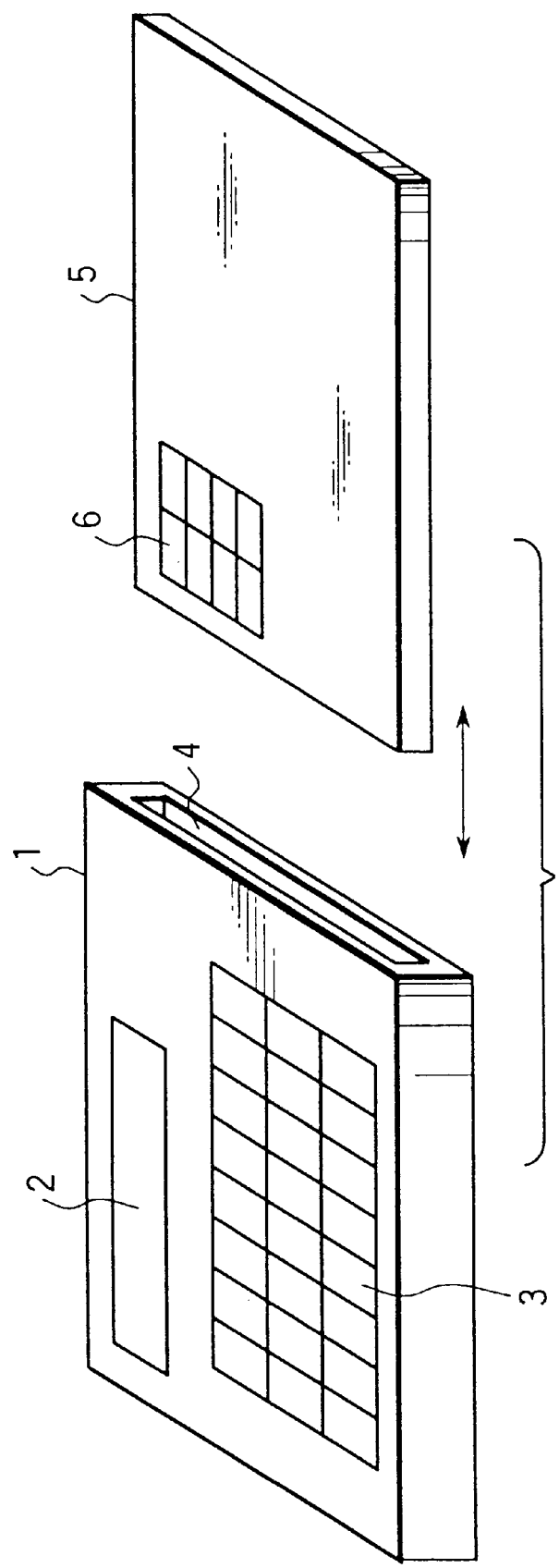
FIG. 1 is a perspective view diagrammatically showing an outer appearance of a portable terminal apparatus and an IC card according to an embodiment of the present invention.
Figure 2:
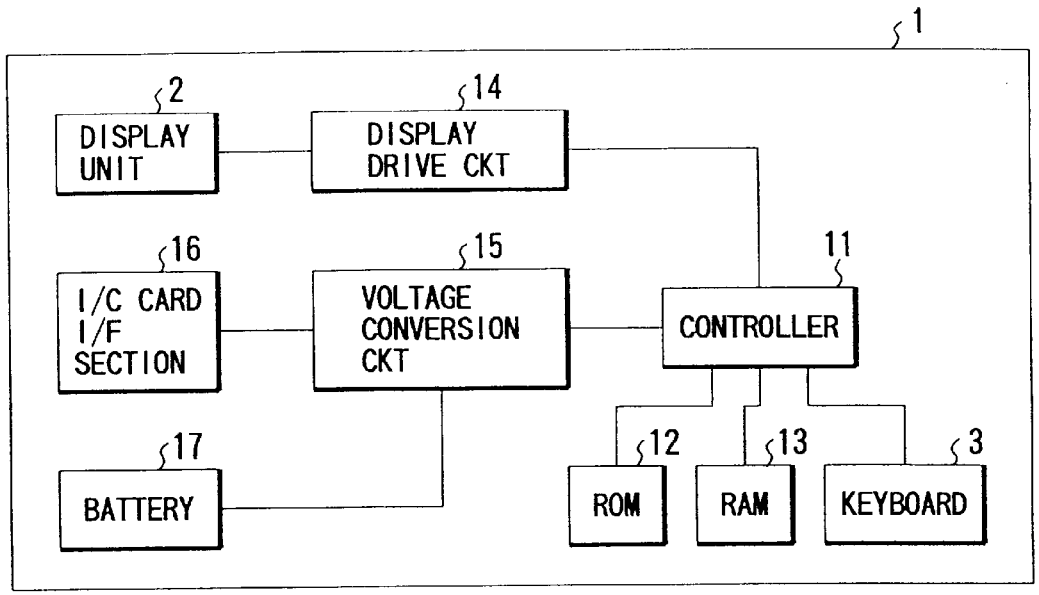
FIG. 2 is a block diagram showing an arrangement of the portable terminal apparatus for the IC card.

FIG. 1 shows a portable terminal apparatus according to an embodiment of the present invention and an associated IC card shown as an outer appearance. That is, the portable terminal apparatus 1 is formed to have a card-like configuration. The apparatus has, on one surface side, a display means 2 for displaying various data as well as a keyboard 3 serving as an input means for inputting password data and other data. A card insertion inlet 4 is provided on one side face of the portable terminal apparatus 1 to allow the IC card 5 to be inserted and set therein. The IC card 5 has a contact section 6 provided at a predetermined place on one surface and adapted to be electrically connected to an interface section of the portable terminal apparatus 1. FIG. 2 shows an arrangement of the portable terminal apparatus 1 diagrammatically. That is, a controller 11 is comprised of, mainly, a CPU and provides general control. A ROM (read only memory) 12 for storing a control program, etc.; a RAM (random access memory) 13 serving as a memory means for use in a work memory; a display drive circuit 14 for effecting the drive control of the display section, an IC card drive voltage conversion circuit 15; and a keyboard 3 are connected to the controller 11.

An IC card interface (I/F) section 16 and a battery 17 are connected to the voltage conversion circuit 15. The interface section 16 serves as an interface means for signal transfer to and from the IC card via the contact section 6 and the battery 17 serves as a power source. For example, the battery is a 3 volt battery for use as an output power.

Figure 3:
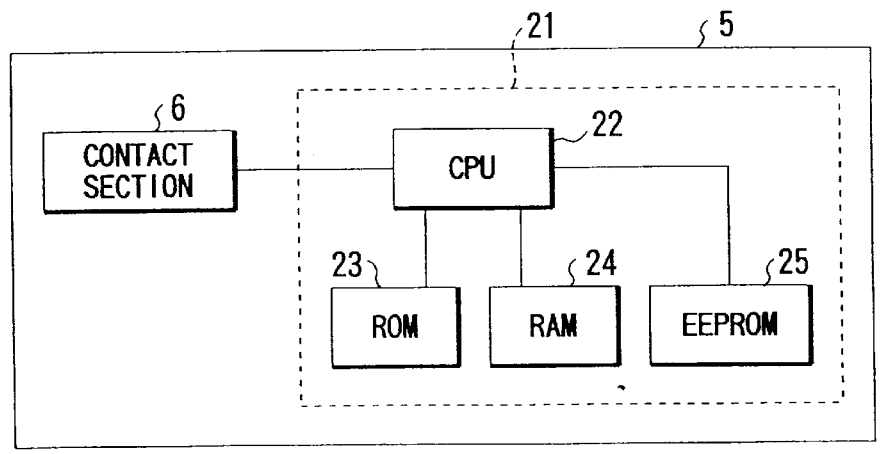
FIG. 3 is a block diagram showing an arrangement of the IC card.

FIG. 3 diagrammatically shows an arrangement of the IC card 5. That is, the IC card 5 is comprised of the contact section 6 and an IC chip 21. The IC chip 21 includes a CPU 22 which serves as a control device, a ROM 23 for storing a control program of the CPU 22, a RAM 24 which serves as a work memory, an EEPROM 25 which serves as a nonvolatile memory for data storage, and so on.

FIG. 4 shows an arrangement of a voltage conversion circuit 15. The voltage conversion circuit 15 comprises a converter 31 and four IC versions of buffer circuits 32, 33, 34, 35. The circuit 15 uses five control signals and a power source voltage input from the power source 17. That is, a CNT signal is formed by a control signal for converting, for example, +3V to +5V, and is supplied to the converter 31. Through the application of the CNT signal, the converter 31 converts a power source voltage (+3V) from the power source 17 to +5V. The converted voltage is supplied as a VCC signal (power source voltage) from the IC card I/F section 16 to the IC card 5.

A CNT-RST signal corresponds to a +3V level reset signal from the controller 11 and is converted to a +5V level by the buffer circuit 32 connected to a +5V line 36 leading to the output terminal of the converter 31. The converted voltage level is passed through the IC card I/F section 16 and serves as a RST signal (a reset signal) to the IC card 5.

A CNT-CLK signal corresponds to a +3V level clock signal from the control section 11 and is converted to a +5V level by a buffer circuit 33 connected to a +5V line 36 leading to the output terminal of the converter 31. The converted voltage passes through the IC card I/F section 16 and serves as a CLK signal (clock signal) to the IC card 5.

A CNT-IO-IN signal corresponds to a signal obtained by converting a 5V level I/O signal (data signal) which comes from the I/C card 5 through the I/C card I/F section 16 to a +3V level signal by means of the buffer circuit 34 connected to a +3V line 37 coming from the battery 17. The CNT-IO-IN signal is input to the control section 11.

A CNT-IO-OUT signal corresponds to a +3V level data signal from the control section 11. This signal is converted to a +5V level by a buffer circuit 35 connected to the +5V line 36 leading to the output terminal of the converter 31 and serves as an I/O signal (data signal) to the I/C card 5 via the I/C card I/F section 16.

Figure 5:
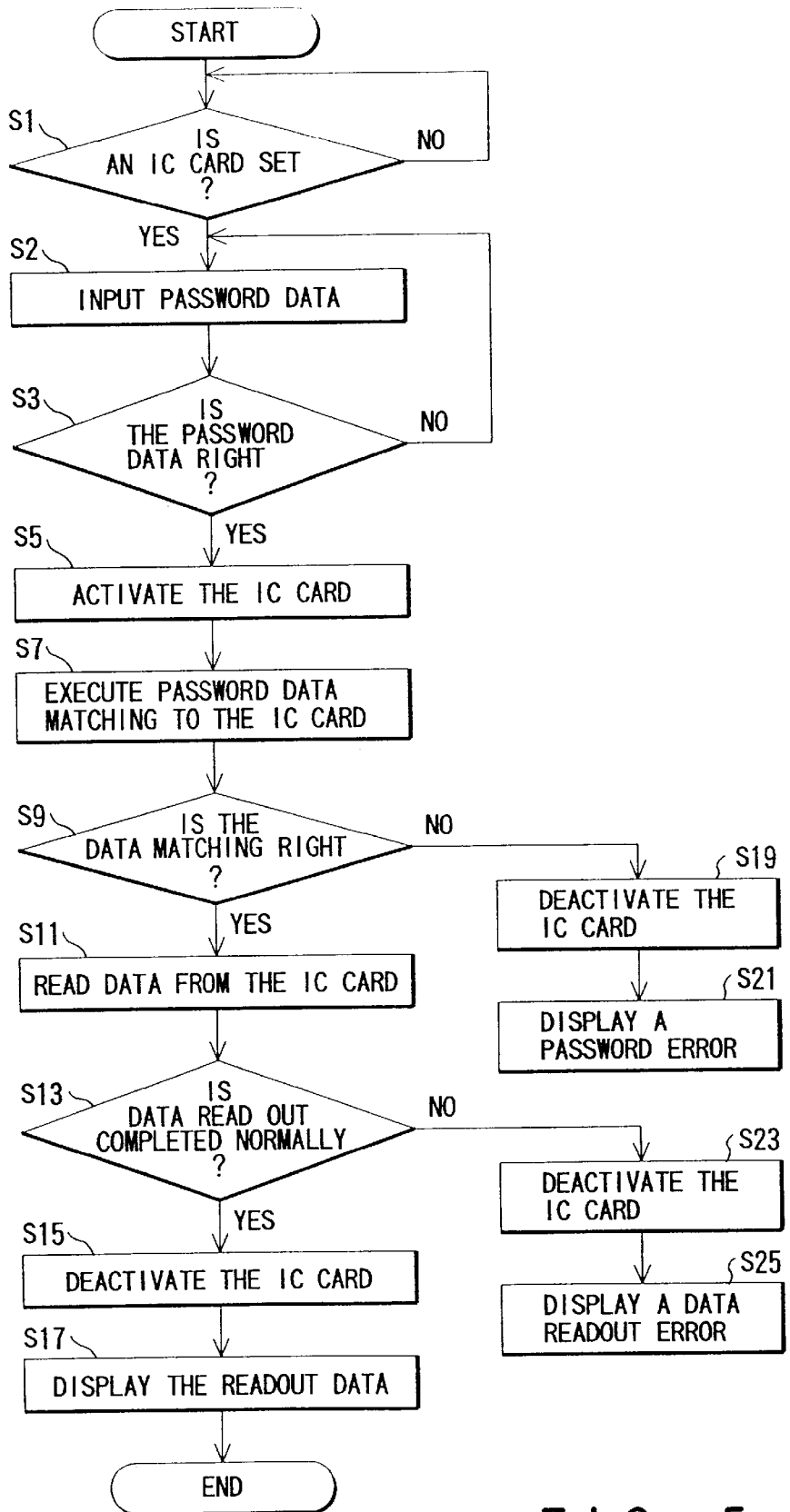
FIG. 5 is a flow chart explaining a readout operation of data from the IC card.

In the arrangement above, the data read operation from the I/C card 5 will be explained below with reference to the flow chart shown in FIG. 5.

In the arrangement above, if data is to be read out from the I/C card 5, confirmation is made as to whether or not the I/C card 5 is inserted via the card insertion inlet and set in the apparatus (S1). Then password data (for example, a personal identification number) is input from the keyboard 3 for key matching. The controller 11 decides whether or not the password is duly entered in the apparatus (S3). If YES, the controller 11 commands the activation of the IC card 5 (S5).

The activation operation is carried out as follows. That is, by the enabling of a CNT signal, a VCC signal (power source voltage) of +5V is supplied to the IC card 5, while, at the same time, by the enabling of a CNT-CLK signal, a CLK signal is supplied to the IC card 5. Further, a CNT-RST signal is changed from an ON state to an OFF state. By a CNT-IO-IN signal, the controller circuit 11 receives an initial response data from the IC card 5.

If the initial response data is duly received from the IC card 5, the controller 11 sends a key matching command to the IC card 5 by the previously input password (S7). By doing so, the key matching processing (the matching of the password data) is effected in the IC card 5.

If any error occurs in the key matching processing (S9), the controller 11 commands the deactivation of the IC card 5 (S19). The deactivation operation is carried out as follows. That is, the CNT-RST signal is turned ON and the CNT-CLK signal is turned OFF and, further, the CNT signal is turned OFF. The controller 11 commands a massage showing a password error to be displayed on a display unit 2 (S21).

If the key matching processing is properly completed (S9), the controller 11 commands the execution of a data readout to the IC card (S11). Given data is read from the EEPROM 25 of the IC card 5 (S13) and stored in a RAM 13. Thereafter, even with the IC card in the inserted state, the controller 11 commands the deactivation of the IC card 5 as set out above (S15). Then the controller 11 commands the display, on the display unit 2, of the readout data stored from the IC card 5 into the RAM 13 (S17).

There is sometimes the case where a plurality of data are read out of the IC card 5 and temporarily stored in the RAM 13 and, by a select operation at the keyboard 3, desired data is selected from the RAM 13 and displayed on the display unit 2. There is also the case where, by a predetermined key operation at the keyboard 3, calculation is performed, on the data of the RAM 13, based on a specific algorithm and a result of computation is displayed on the display unit 2.

If an error occurs in the read processing (S13), the controller 11 commands the deactivation of the IC card 5 (S23). The controller 11 enables the display, on the display unit 2, of a message showing a data readout error (S25).

As set out above, according to the embodiment, since, even at a time of normal data reading operation, the readout data is displayed at the end of the deactivation of the IC card, the access time of the IC card is minimal. Thus the lifetime of the battery serving as the power source becomes is prolonged.

Figure 6:
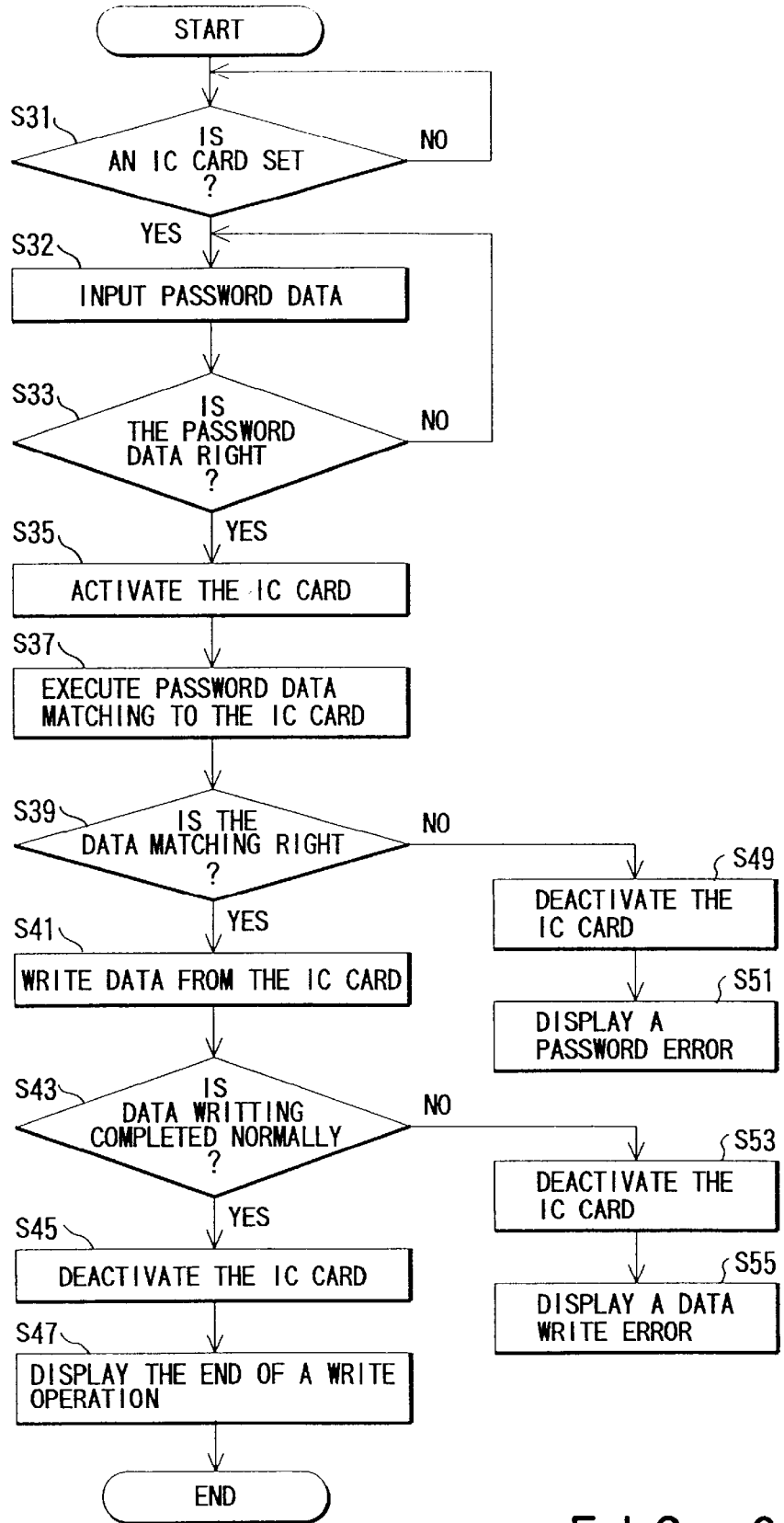
FIG. 6 is a flow chart explaining the operation of writing data to the IC card.

With reference to the flow chart shown in FIG. 6, explanation will be given about the operation of writing data from the IC card 5 in the arrangement as set out above.

In the case where data is to be written into the IC card 5, confirmation is made as to whether or not the IC card 5 is inserted through the card insertion inlet and set in the apparatus (S31). First, a password (such as a personal identification number) is input from the keyboard 3 to the apparatus for key matching (S32). If the controller 11 decides the password as being duly input to the apparatus (S33), the controller 11 enables the activation of the IC card 5 (S35).

The activation of the IC card is effected as follows. That is, by turning a CNT signal ON, a VCC (power source voltage) of +5V is supplied to the IC card 5 and, through the turning ON of a CNT-CLK signal, a CLK signal is supplied from the IC card 5 to the apparatus and, further, a CNT-RST signal is changed from an ON state to an OFF state. By a CNT-IO-IN signal, the controller 11 receives an initial response data from the IC card 5.

If the initial response data is duly received from the IC card 5, the controller 11 executes a key matching command to the IC card 5 by the initially input password data (S37). By doing so, the key matching processing (the matching of the password data) is performed in the IC card 5.

If an error is generated in the key matching processing (S39), the controller 11 enables the deactivation of the IC card 5 (S49). The deactivation operation is carried out as follows. That is, the CNT-RST signal is turned ON, the CNT-CLK signal is turned OFF and the CNT signal is turned OFF. The controller 11 enables the display, on the display unit 2, of a message showing a password error (S51).

If the key matching processing is duly ended (S39), the controller 11 executes data write command to the IC card 5 (S41) and, by doing so, given data input to the EEPROM 25 in the IC card 5 is written in the apparatus (S43). Even with the IC card set in the apparatus, the controller 11 executes the deactivation of the IC card 5 (S45). Then, the controller 11 enables the display, on the display unit 2, of the end of the write operation (S47).

If any error occurs in the write processing (S43), the controller 11 enables the execution of the deactivate operation to the IC card 5 (S53). The controller 11 enables the display, on the display unit 2, of a message showing the data write error (S55).

According to the embodiment as set out above, the battery (power source) is made lower in voltage involved and the operation voltage stays at a lower voltage (3V). As a whole, dissipation current can be lowered because a signal voltage for the IC card I/F is applied only to the case where it is necessary to achieve the conversion of the lower voltage by the voltage conversion circuit to a specific voltage (5V) for the IC card.

Further, in the case where the key matching is effected for the IC card, a time taken for access to be gained to the IC card becomes minimal because the password data is input to the apparatus before the activation of the IC card. In consequence, the battery life as the power source becomes prolonged.

In the case where any error is generated at a time of gaining access to the IC card, an error status is displayed after the deactivate operation of the IC card and the time for access to the IC card becomes minimal. Thus, the battery life becomes lengthened.

Even at a time of normal data read operation, a readout data is displayed after the deactivate operation of the IC card has been ended. This also ensures a minimal access time for the IC card and prolonged battery life.

Even in a write operation, the activate operation is performed after the setting of the password and the deactivate operation is performed after the ending of the write operation. This can minimize the dissipation of the power source (battery).

According to the present invention, as set out more in detail, it is possible to provide a portable terminal apparatus for the IC card which can reduce the dissipation current as a whole and lengthen the battery life.

Additional advantages and modifications will readily occur to those skilled in the art. Therefore, the invention in its broader aspects is not limited to the specific details, and representative embodiments shown and described herein. Accordingly, various modifications may be made without departing from the spirit or scope of the general inventive concept as defined by the appended claims and their equivalents.

I claim:

1. A portable terminal apparatus for an IC card, the portable terminal apparatus comprising:

an IC card insertion section;

an inputting section for inputting key data;

means for supplying a power source voltage to an IC card inserted in the IC card insertion section, only after the key data is input by the inputting section;

matching means for transmitting a key matching command with the key input data to the IC card to have key matching executed in the IC card;

processing means for reading data from and writing data to the IC card, when the key matching is carried out without errors;

means for stopping the power source voltage to the IC card, when the key matching is not completed successfully or when the processing means completes processing data with the IC card; and means for displaying the data read from the IC card by the processing means, after the stopping means stops supplying the power source voltage to the IC card.

2. The portable terminal apparatus as claimed in claim 1, wherein the supplying means comprises a battery for generating a first voltage and a voltage conversion circuit for increasing the first voltage generated by the battery to a second voltage, the second voltage being higher than the first voltage and being supplied to the IC card.

3. A portable terminal apparatus for an IC card, the portable terminal apparatus comprising:

an IC card insertion section;

an inputting section for inputting key data;

an interface circuit for transmitting a signal to and receiving another signal from an IC card inserted in the IC card insertion section;

means for generating a first voltage which is lower than a voltage for driving the IC card, the first voltage being used as a driving power source for the portable terminal apparatus;

a converting circuit which converts a power source voltage, a clock signal, a reset signal, and an input data signal, which are sent to the IC card through the interface circuit, to have a second voltage, the second voltage being higher than the first voltage generated by the voltage generating means, and for converting an output data signal output from the IC card so that the output data signal has the same voltage level as the first voltage;

activating means for supplying the power source voltage, the clock signal, and the reset signal, which are converted by the converting circuit through the interface circuit, thereby activating the IC card, only after the key data is input by the inputting section;

means for reading data from the IC card;

means for stopping the power source voltage and the clock signal to the IC card, after the reading means reads the data; and means for displaying data read from the IC card by the reading means, after the stopping means stops supplying the power source voltage to the IC card.

4. A portable terminal apparatus for an IC card, the portable terminal apparatus comprising:

an IC card insertion section;

an inputting section for inputting key data;

an interface circuit for transmitting a signal to and receiving another signal from an IC card inserted in the IC card insertion section;

a voltage circuit which generates a power source voltage to be supplied through the interface circuit to the IC card inserted in the IC card insertion section;

a controller which controls the portable terminal apparatus such that the power source voltage generated by the voltage circuit is supplied to the IC card only after the key data is input by the inputting section, a key matching command is transmitted to the IC card with the key data input by the inputting section to have key matching executed in the IC card, reading data from or writing data in the IC card is executed when the key matching is carried out without errors, and stopping the power source voltage to the IC card when an error occurs in the key matching or the reading of data from or writing of data in the IC card is complete; and means for displaying the data read from the IC card, after the supplying of the power source voltage to the IC card is stopped.

5. A method for operating a system which includes a terminal apparatus and an IC card, said method comprising:

confirming that an IC card is inserted in the terminal apparatus;

confirming that key data is input by an inputting section in the terminal apparatus, after it is confirmed that the IC card is inserted in the terminal apparatus;

supplying a power supply voltage to the IC card, only after it is confirmed that the key data is input;

transmitting a key matching command with the input key data to the IC card to have key matching executed in the IC card;

reading data from or writing data to the IC card, when the key matching is carried out without errors;

stopping the power supply voltage to the IC card, when an error occurs in the key matching or when the reading data from or writing data to the IC card is completed; and displaying the data read from the IC card, after the supplying of the power source voltage to the IC card is stopped.

* * * * *